United States Patent
Becoulet et al.

(10) Patent No.: US 12,509,995 B2
(45) Date of Patent: Dec. 30, 2025

(54) TURBOMACHINE SUBASSEMBLY COMPRISING A GOOSENECK OF IMPROVED CONFIGURATION, AND TURBOMACHINE COMPRISING SUCH A SUBASSEMBLY

(71) Applicant: SAFRAN AIRCRAFT ENGINES, Paris (FR)

(72) Inventors: Julien Fabien Patrick Becoulet, Moissy-Cramayel (FR); Laurent Soulat, Moissy-Cramayel (FR); Sébastien Emile Philippe Tajan, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/723,250

(22) PCT Filed: Dec. 15, 2022

(86) PCT No.: PCT/FR2022/052390
§ 371 (c)(1),
(2) Date: Jun. 21, 2024

(87) PCT Pub. No.: WO2023/118706
PCT Pub. Date: Jun. 29, 2023

(65) Prior Publication Data
US 2025/0052165 A1  Feb. 13, 2025

(30) Foreign Application Priority Data
Dec. 22, 2021 (FR) .................................... 2114236

(51) Int. Cl.
*F01D 9/04* (2006.01)
*F04D 29/54* (2006.01)

(52) U.S. Cl.
CPC ........... *F01D 9/041* (2013.01); *F04D 29/542* (2013.01); *F05D 2220/323* (2013.01); *F05D 2250/71* (2013.01)

(58) Field of Classification Search
CPC . F01D 9/041; F01D 25/16; F05D 2260/22141
See application file for complete search history.

(56) References Cited

U.S. PATENT DOCUMENTS 3,477,231 A * 11/1969 Paulson ................. B64D 33/02
415/119
4,116,584 A * 9/1978 Bammert .............. F04D 19/028
415/209.1
(Continued)

FOREIGN PATENT DOCUMENTS

EP         0837247 A2    4/1998
FR         2880391 A1    7/2006
WO      2014105515 A1    7/2014

OTHER PUBLICATIONS

Search Report and Written Opinion issued in International Application No. PCT/FR2022/052390, mailed Mar. 24, 2023.
(Continued)

*Primary Examiner* — Justin D Seabe
(74) *Attorney, Agent, or Firm* — Bookoff McAndrews, PLLC

(57) ABSTRACT

The invention relates to an aircraft turbomachine subassembly comprising an annular duct (36) extending concentrically about a longitudinal axis and in which an air stream flows from upstream to downstream, the annular duct comprising a duct portion (28) defining a swan neck having an upstream inlet section and a downstream outlet section. A plurality of radial arms (B1, B2) extend circumferentially in the duct portion (28). One or several intermediate walls (P1, P2) extend between two circumferentially adjacent arms (B1, B2) which form a pair of circumferentially adjacent
(Continued)

arms among the plurality of circumferentially adjacent arms so as to locally separate, between the two arms of the pair of arms, the annular duct portion (28) into a radially inner portion (Ci) and a radially outer portion (Ce) further away from the longitudinal axis than the radially inner portion.

15 Claims, 6 Drawing Sheets

(56) References Cited

U.S. PATENT DOCUMENTS

| | | | |
|---|---|---|---|
| 6,901,739 B2* | 6/2005 | Christopherson | F01D 17/141 |
| | | | 60/226.3 |
| 9,957,895 B2* | 5/2018 | Suciu | F01D 9/041 |
| 10,550,726 B2* | 2/2020 | Moniz | F01D 25/16 |
| 11,852,099 B1* | 12/2023 | Pachidis | F02K 1/66 |
| 2018/0216493 A1 | 8/2018 | Moniz et al. | |

OTHER PUBLICATIONS

Search Report and Written Opinion issued in French Application No. 2114236, mailed Oct. 21, 2022.

\* cited by examiner

[Fig. 1]
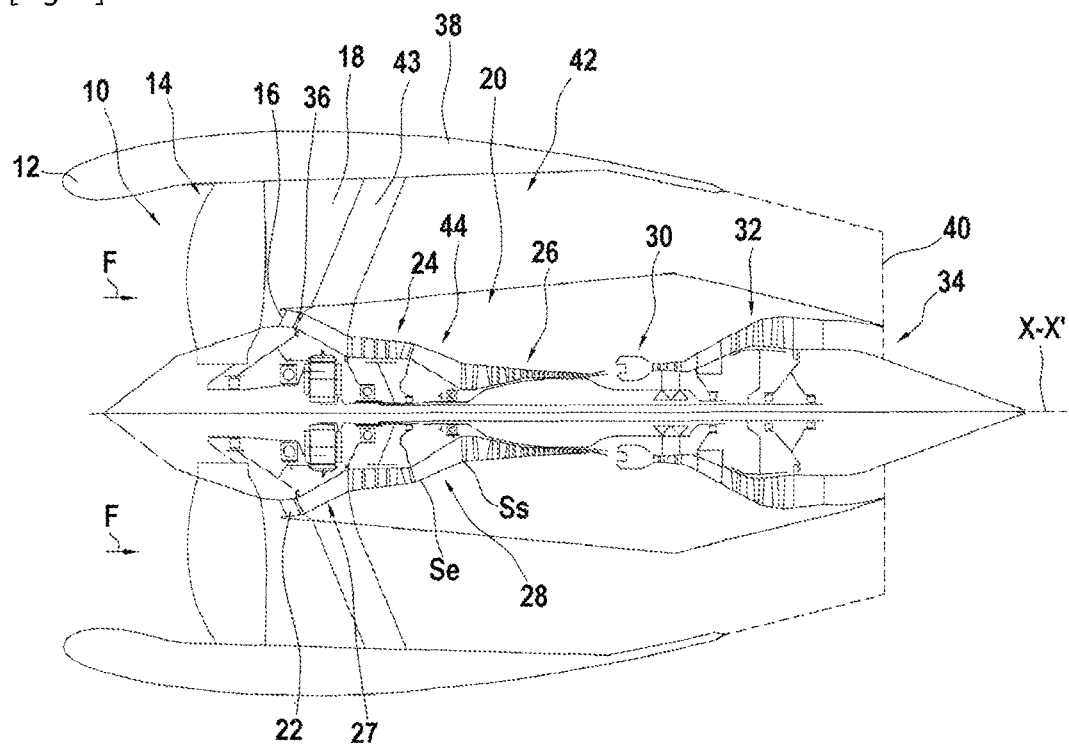
[Fig 2]
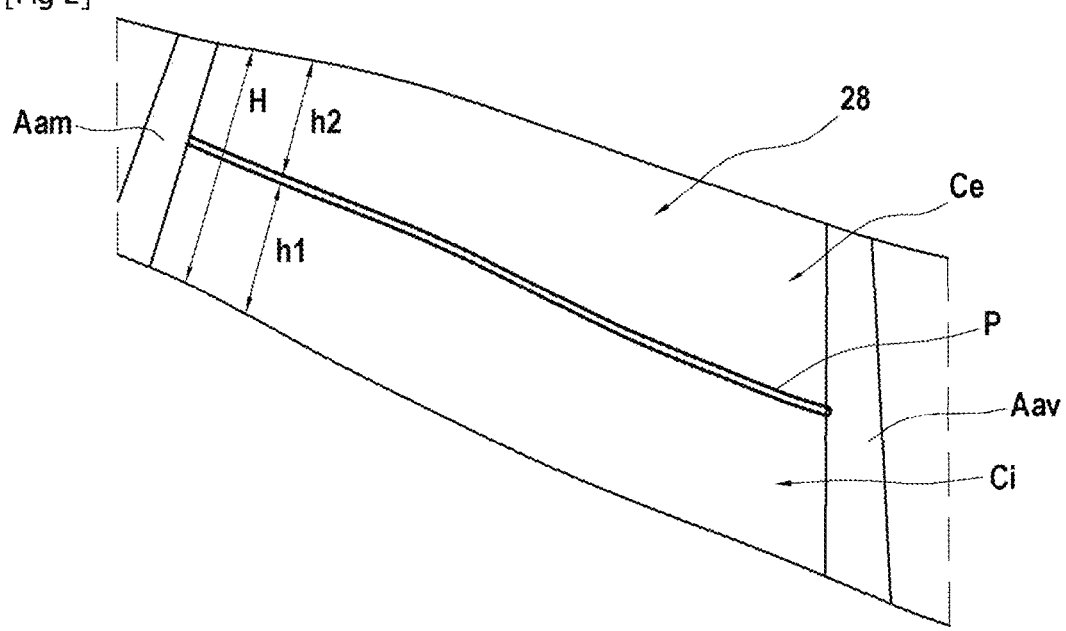

[Fig. 3A]
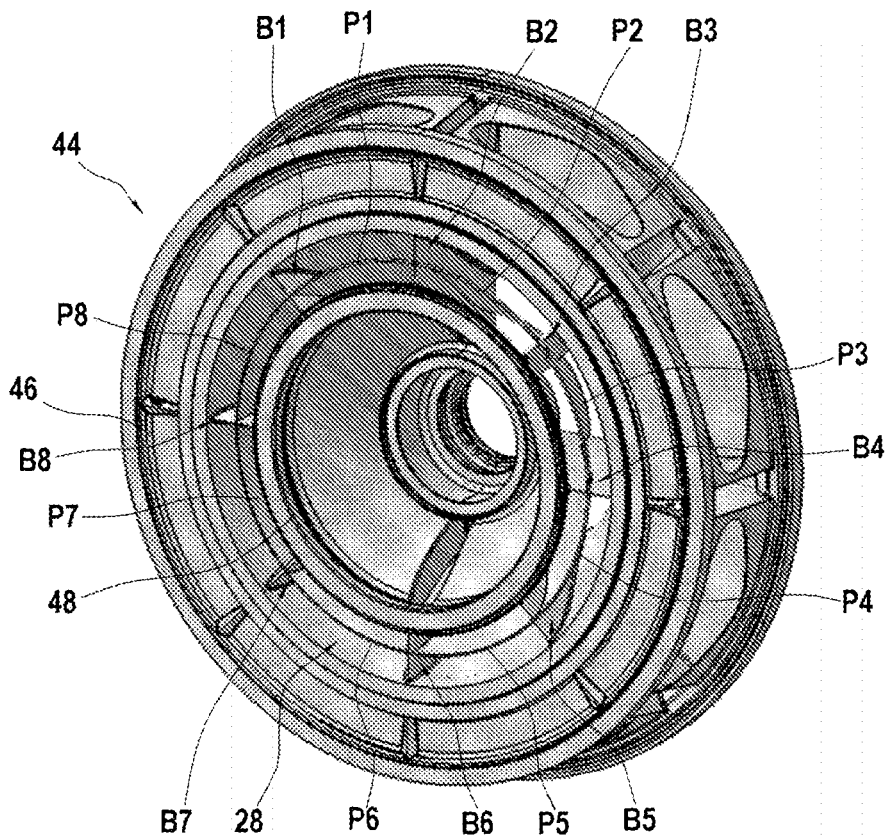
[Fig. 3B]
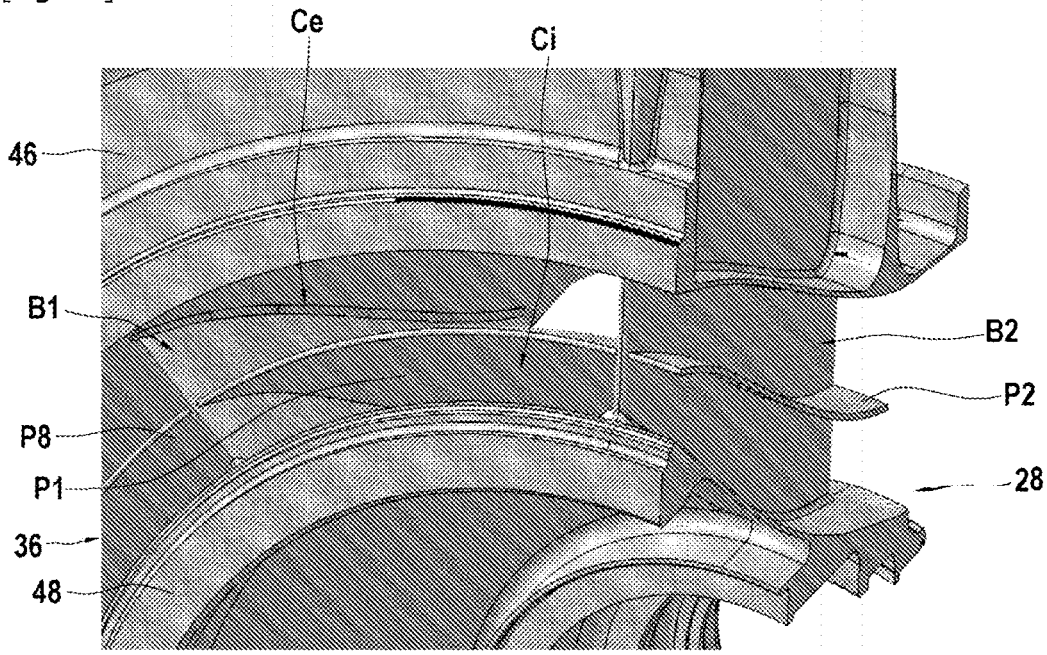

[Fig. 3C]
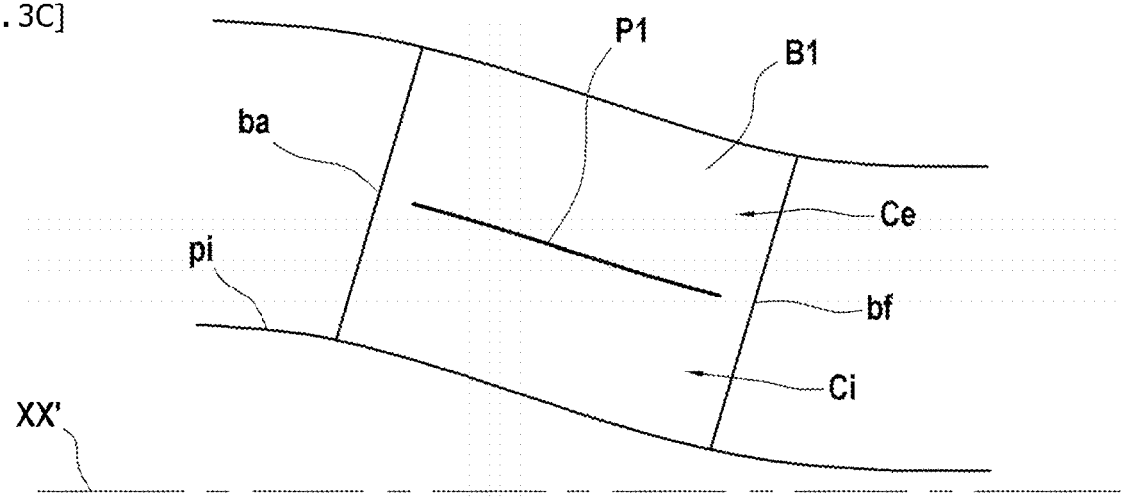
[Fig. 4]
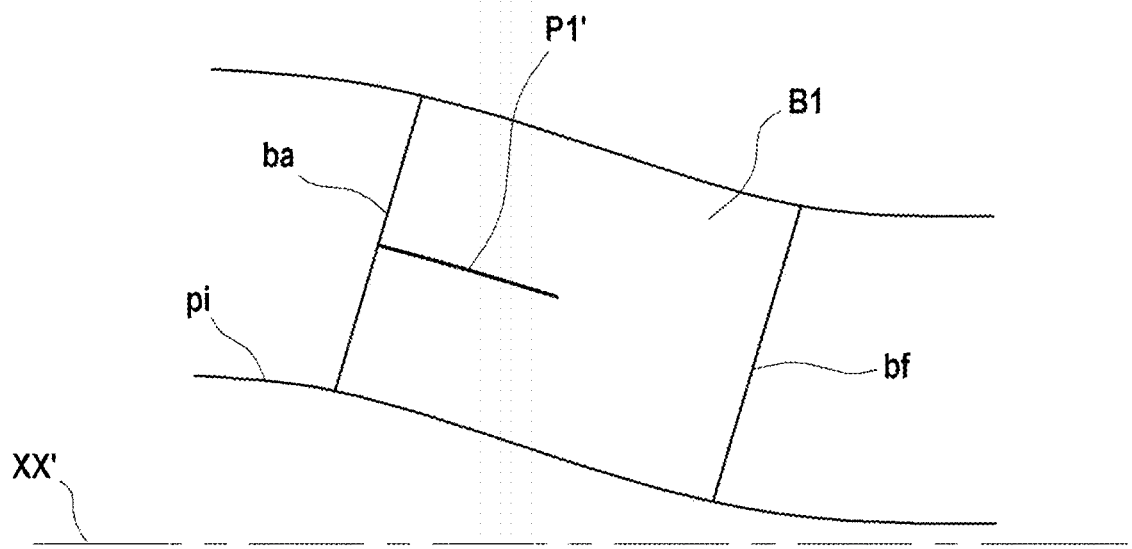

[Fig. 5]
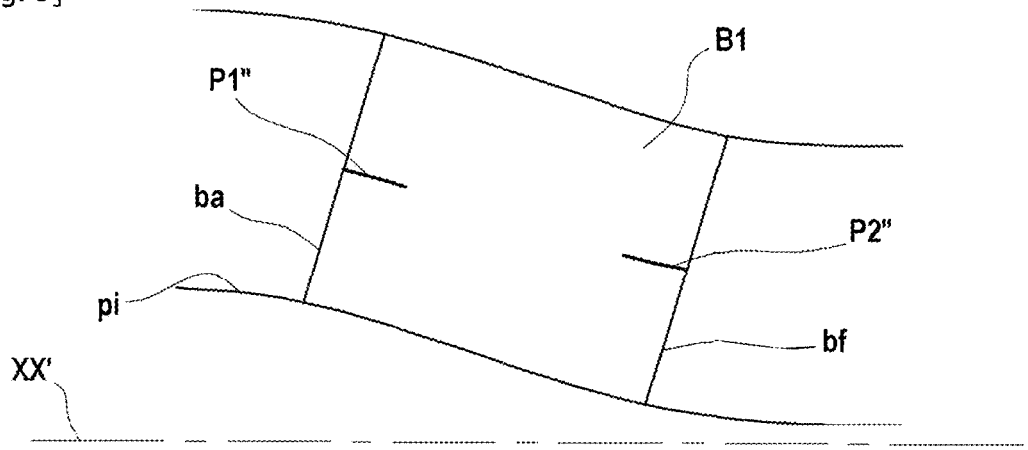
[Fig. 6]
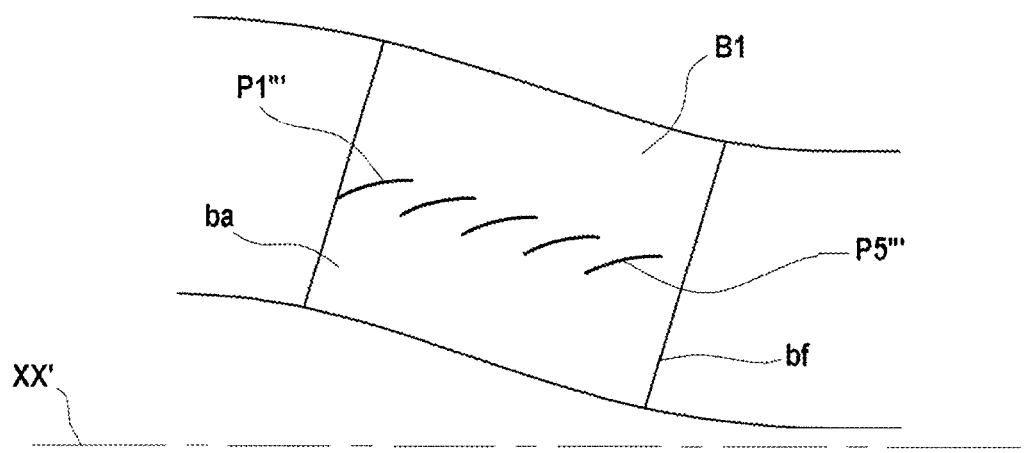
[Fig. 7A]
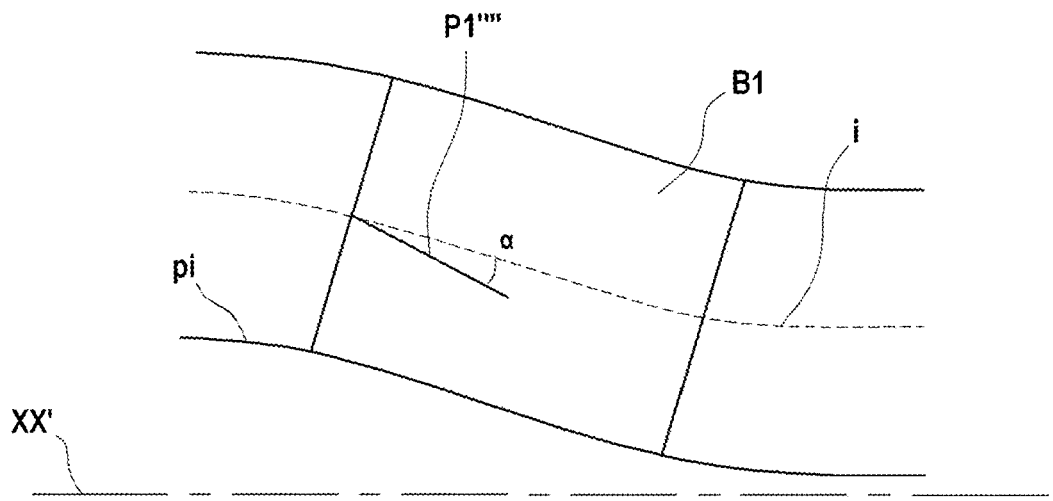

[Fig. 7B]
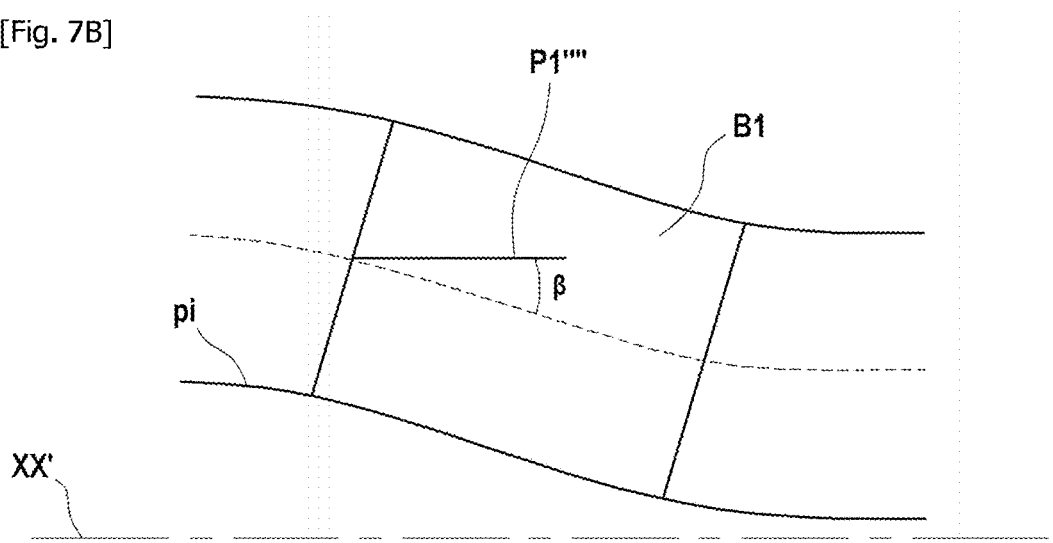
[Fig. 8A]
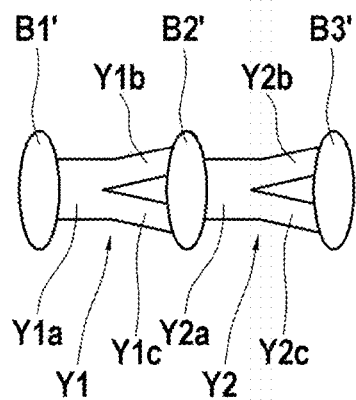

[Fig. 8B]
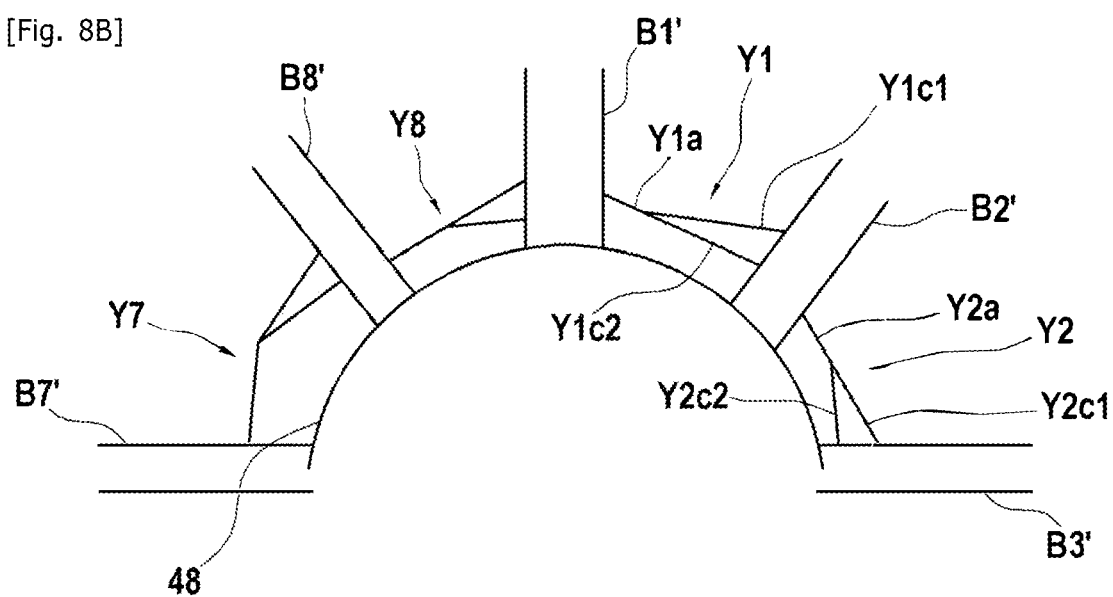
[Fig. 9]
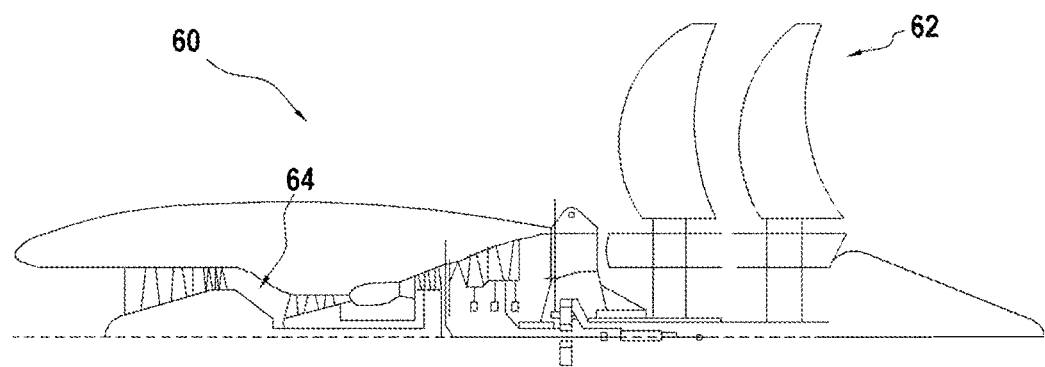

TURBOMACHINE SUBASSEMBLY COMPRISING A GOOSENECK OF IMPROVED CONFIGURATION, AND TURBOMACHINE COMPRISING SUCH A SUBASSEMBLY

CROSS-REFERENCE TO RELATED APPLICATIONS

This is a National Stage Application under 35 U.S.C. § 371 of International Application No. PCT/FR2022/052390, filed Dec. 15, 2022, now published as WO 2023/118706 A1, which claims priority to French Patent Application No. 2114236, filed on Dec. 22, 2021.

TECHNICAL FIELD

This present disclosure concerns a swan neck aircraft turbomachine subassembly and a turbomachine comprising such a subassembly.

PRIOR ART

Aircraft turbomachines are known such as aircraft turbojet engines whose internal architecture successively comprises, from upstream to downstream in the direction of circulation of a primary air path which comes from the air inlet of the turbojet engine, a low-pressure casing containing in particular a compressor and a low-pressure turbine, an intermediate casing and a high-pressure casing containing in particular a compressor and a high-pressure turbine. These three casings are generally aligned along a longitudinal direction which is given by a longitudinal axis of the turbojet engine. These casings are configured so as to define an inner annular duct which extends concentrically about the longitudinal axis of the turbojet engine, from the low-pressure casing to the high-pressure casing. The primary air path flows inside the annular duct from upstream to downstream of this duct. The annular duct portion which is defined by the intermediate casing includes a swan neck or an S shape (seen in longitudinal section) which defines, for the primary air path circulating in the annular duct, a transition area between the low-pressure and high-pressure casings.

Such a swan neck is characterized by several geometric parameters including the slope of the swan neck (radial deflection between the upstream inlet section of the swan neck and the downstream outlet section of the latter), the height of the swan neck (ability to ensure the aforementioned radial deflection) and the diffusion of the swan neck, namely the intrinsic slowing down related to the geometry of the swan neck and which is imposed on the air flow. The criticality of the swan neck is all the greater as its slope is steep and its height is great. In such a case, the guiding of the air flow in the swan neck is difficult and the risks of aerodynamic detachment of the air path are high. Conversely, the criticality of the swan neck is low when the slope and the height of the swan neck are small to the extent that the air flow is then quite naturally guided by this swan neck geometry. When the slope of the swan neck is steep and its height is small, the air flow must be strongly guided but the proximity of the walls delimiting the swan neck facilitates this guiding. When the slope of the swan neck is small and its height is steep, the air flow does not need to be strongly guided and this flow is naturally guided by this swan neck geometry.

Some internal aircraft turbojet engine architectures impose a steeply sloping swan neck geometry (highly constrained swan neck), which increases the criticality of the swan neck from the aerodynamic point of view.

In order to reduce the criticality of the swan neck, it is generally envisaged to modify one of its geometric characteristics. The simplest geometric modification consists in increasing the length (longitudinal dimension) of the swan neck to reduce its slope in order to reduce its criticality.

However, such a geometric modification has a significant impact on the onboard mass.

It would therefore be interesting to design a new swan neck configuration for an aircraft turbomachine subassembly making it possible to limit the criticality of the swan neck, in particular without significantly impacting the onboard mass.

DISCLOSURE OF THE INVENTION

The object of the present invention is thus a turbomachine subassembly comprising an annular duct which extends concentrically about a longitudinal axis XX' and in which an air stream flows from upstream to downstream, the annular duct comprising at least one duct portion which defines, for the air stream, a swan neck having an upstream inlet section and a downstream outlet section, the aircraft turbomachine subassembly comprising, in said at least one duct portion, a plurality of arms which extend according to a circumferential distribution relative to the longitudinal axis XX' in a spaced manner from each other, each following a radial and axial extension, characterized in that the aircraft turbomachine subassembly comprises one or several intermediate walls extending between two circumferentially adjacent arms which form a pair of circumferentially adjacent arms among the plurality of circumferentially adjacent arms so as to locally separate, between the two arms of the pair of arms, said at least one annular duct portion into a radially inner portion for an inner portion of the air stream and a radially outer portion further away from the longitudinal axis XX' than the radially inner portion for an outer portion of the air stream.

The addition of one or several intermediate walls between at least two circumferentially adjacent arms of the swan neck makes it possible to locally transform the air stream or air path by separating it into two air streams or air paths each of reduced height relative to the height of the air stream/path, namely an inner portion of the air stream and an outer portion of the air stream. The air stream is therefore better guided in the swan neck thus configured and the criticality of the swan neck is thus limited. Such an arrangement makes it possible to significantly reduce the height of the air stream/path and therefore to avoid the risk of flow detachment. Moreover, such an arrangement also makes it possible to have a steeply sloping swan neck with a relatively low longitudinal or axial extension, that is to say a relatively axially short swan neck (to limit the mass onboard the turbomachine subassembly), while considerably limiting the criticality of the swan neck.

According to other possible characteristics:
  the downstream outlet section of the swan neck is closer to the longitudinal axis than the upstream inlet section;
  the intermediate wall which extends between the two circumferentially adjacent arms is axially centered relative to the axial extension of the two arms;
  the intermediate wall which extends between the two circumferentially adjacent arms is axially offset upstream with respect to a centered position relative to the axial extension of the two arms;

the aircraft turbomachine subassembly comprises means for modifying an inclination of the intermediate wall(s) relative to said at least one annular duct portion;

the intermediate wall which extends between the two circumferentially adjacent arms has, following a radial view, a general Y shape whose common branch of the Y is disposed against a first of the two circumferentially adjacent arms and the two branches of the Y are disposed against the second of the two arms;

the intermediate wall which extends between the two circumferentially adjacent arms has, following a cross-sectional view relative to the longitudinal axis XX', a general Y shape whose common branch of the Y is disposed against the first arm and the two end branches of the Y disposed against the second arm are each split so as to each form two end sub-branches giving the Y shape following this cross section;

when the aircraft turbomachine subassembly comprises several intermediate walls between the two circumferentially adjacent arms, the intermediate walls are axially distributed following the axial extension of the two arms;

the aircraft turbomachine subassembly comprises, on the one hand, an upstream intermediate wall disposed between the two arms at the level of an edge called leading edge of each of the two arms and, on the other hand, a downstream intermediate wall disposed between the two arms at the level of an opposite edge called trailing edge of each of the two arms;

the aircraft turbomachine subassembly comprises a series of intermediate walls which axially extend successively between an edge called leading edge of each of the two arms and an edge called trailing edge of each of the two arms;

the series of intermediate walls is configured axially such that a first intermediate wall of the series of intermediate walls is disposed at the level of the leading edge of each of the two arms and such that a last intermediate wall of the series of intermediate walls is disposed upstream of the trailing edge of each of the two arms or at this trailing edge;

each of the intermediate walls has a radial position which is different according to the axial position it occupies relative to the axial extension of the two circumferentially adjacent arms along the longitudinal axis XX';

the aircraft turbomachine subassembly comprises, for each of one or several other pairs of circumferentially adjacent arms of the plurality of circumferentially adjacent arms, one or several intermediate walls extending between the two circumferentially adjacent arms of the pair or other pairs of circumferentially adjacent arms so as to locally separate, between the two arms of the pair of arms or each of the other pairs of arms, said at least one annular duct portion into a radially inner portion and a radially outer portion further away from the longitudinal axis XX' than the radially inner portion;

the circumferentially adjacent arms have no function of straightening the air stream flowing in the annular duct;

the aircraft turbomachine subassembly comprises at least two duct portions each defining a swan neck and which are spaced from each other along the longitudinal axis XX'.

The invention also relates to an aircraft turbomachine comprising an aircraft turbomachine subassembly as briefly set out above.

BRIEF DESCRIPTION OF THE DRAWINGS

Other characteristics and advantages of the object of this present disclosure will emerge from the following description of embodiments, given by way of non-limiting examples, with reference to the appended figures.

FIG. 1 is a schematic view in longitudinal section of one embodiment of a turbojet engine according to the invention;

FIG. 2 is an enlarged partial schematic view in longitudinal section of the annular duct portion defining the swan neck of FIG. 1;

FIG. 3A is a schematic front perspective view of an intermediate casing of the reactor core of FIG. 1 which integrates a swan neck;

FIG. 3B is an enlarged partial schematic view of an inner region of the casing of FIG. 3A integrating an intermediate wall between two consecutive arms;

FIG. 3C is a very schematic view showing in longitudinal section the centered axial position of the intermediate wall of FIG. 3B;

FIG. 4 is a schematic view of one variant of embodiment of the arrangement of FIG. 3C;

FIG. 5 is a schematic view similar to that of FIGS. 3C and 4 showing another embodiment with two intermediate walls, one upstream and one downstream;

FIG. 6 is a schematic view similar to that of FIG. 5 and showing one variant with a series of intermediate walls;

FIG. 7A is a schematic view showing a possible variation in the downward direction of an inclination of an intermediate wall;

FIG. 7B is a schematic view showing one possible variation in the upward direction of an inclination of an intermediate wall;

FIG. 8A is a schematic view following a radial view of intermediate walls in the general Y shape between two consecutive arms;

FIG. 8B is a schematic view following a cross-sectional view of intermediate walls in the general Y shape between two consecutive arms;

FIG. 9 is a schematic view in longitudinal half-section of another embodiment of a turbojet engine according to the invention.

DETAILED DESCRIPTION

FIG. 1 represents a longitudinal section of a turbomachine such as an aircraft turbojet engine 10 according to one embodiment of the invention (this is a turbofan engine but the invention is however not limited to this type of turbojet engine).

Such a turbojet engine has a general longitudinal shape centered about a longitudinal axis XX' and generally includes successively from upstream to downstream in the direction of circulation of the air stream illustrated by the arrows F (that is to say from left to right in FIG. 1), an air inlet 12 and a fan 14 which provides air to a primary path 16 and to a secondary path 18 arranged coaxially with respect to the primary path 16 and which are both configured in a generally annular shape.

As represented in FIG. 1, the turbojet engine 10 comprises a subassembly such as a reactor core 20 which is configured internally in order to delimit the primary air stream 16 as described below. The reactor core 20 can comprise, more particularly, successively from upstream to downstream:

at the inlet, a plurality of stator guide vanes 22 (IGV) disposed circumferentially relative to the longitudinal axis XX' and which generally have the function of guiding and/or straightening the incoming air stream 16, a low-pressure compressor 24, a transition area 28 located downstream of the low-pressure compressor 24 and which defines a swan neck (this area will be represented more specifically in other figures described subsequently), a high-pressure compressor 26, a combustion chamber 30, a plurality of successive axial turbines generally referenced 32 (high-pressure, intermediate pressure and low-pressure turbines), an outlet orifice 34 of the reactor core 20.

All of the components of the reactor core 20 defined above jointly define an annular duct or passage 36 which extends concentrically about the longitudinal axis XX' and along the longitudinal or axial direction given by this axis over the entire length of the reactor core 20. The primary air path 16 thus flows inside this annular duct 36 to be treated there in a conventional manner: the air path is first compressed successively by the low-pressure compressor 24 and the high-pressure downstream compressor 26, then the compressed air is introduced into the combustion chamber 30 where it is mixed in a known manner with a combustible (fuel) to generate high-temperature combustion gases which then undergo successive expansions in all of the successive turbines 32 before being discharged through the outlet orifice 34 to generate a thrust.

A nacelle 38 is represented in dotted lines in FIG. 1 and concentrically surrounds the turbojet engine 10 in a known manner by delimiting the upstream air inlet 12 and, downstream, an air outlet 40.

The secondary path 18 circulates inside an annular duct 42 arranged concentrically with respect to the annular duct 36 and generates a thrust which is added to the thrust produced by the expanded combustion gases leaving the orifice 34. Radial arms 43 form stator guide vanes 22 (OGV).

The transition area 28 corresponds to an intermediate portion of the annular duct 36 in the shape of a swan neck which comprises an upstream inlet section Se and a downstream outlet section Ss (FIG. 1). The inlet and outlet sections delimit therebetween the swan neck shape which is more or less constrained, that is to say its slope is more or less accentuated. These sections are generally parallel to each other to the extent that the swan neck shape connects together an annular duct portion located upstream of the swan neck (where the compressor 24 is disposed) and an annular duct portion located downstream of the swan neck (where the compressor 26 is disposed) and which is parallel to the upstream annular duct portion.

In the configuration illustrated in FIG. 1, the downstream outlet section Ss is closer to the longitudinal axis XX' than the upstream inlet section Se, thus defining a downwardly sloping swan neck.

FIG. 2 illustrates in a schematic and enlarged manner in longitudinal section the presence of an intermediate wall P in the swan neck 28 which separates or divides locally (that is to say in the region where the intermediate wall extends axially, radially and circumferentially) the annular duct portion into a radially inner portion Ci (inner channel) close to the longitudinal axis XX' and a radially outer portion Ce (outer channel) further away from the longitudinal axis than the inner portion Ci and which is disposed above it in FIG. 2. As represented in FIG. 2, the swan neck 28 is defined here as corresponding to the path part and the associated vane assemblies extending from the trailing edge of the upstream vane assembly Aam (last vane assembly of the upstream compressor 24) to the leading edge of the downstream vane assembly Aav (first vane assembly of the downstream compressor 26).

This arrangement makes it possible to transform the path of height H (height of the swan neck or dimension of a cross section of passage of the swan neck) into two paths of reduced height each: a lower path of height h1 circulating in the radially inner portion Ci (inner channel) and an upper path of height h2 circulating in the radially outer portion Ce (outer channel). The air stream circulating in the swan neck 28 is thus better guided in each of the radially inner and outer portions than in a swan neck without an intermediate wall P and the criticality of the swan neck is thus limited.

FIG. 2 illustrates the height H which is one of the two geometric parameters of the swan neck which are its height H and its slope which forms an angle with respect to the longitudinal direction of the axis XX'.

FIGS. 3A and 3B are detailed views which represent the application of the principle illustrated in FIG. 2 to the intermediate casing 44 of the reactor core 20 of FIG. 1. It will however be noted that the principle illustrated in FIG. 2 can also be applied to the upstream swan neck 27 which forms here part of the inlet casing, or to the downstream casing, in addition to or instead of the swan neck 28.

As represented in FIGS. 3A and 3B, the casing 44 includes an outer part forming an annular belt 46 which borders externally the inner transition area in the form of a swan neck 28. The annular belt 46 and the swan neck 28 are both disposed concentrically with respect to a portion of the inner hub 48 of the reactor core 20, the annular duct 36 surrounding this inner hub. Only a portion of the inner hub 48 has been represented in FIGS. 3A and 3B.

A plurality of arms, here eight arms B1-B8 (this number may however differ depending on the turbojet engine configurations), are arranged inside the swan neck 28 by extending radially according to a circumferential distribution relative to the longitudinal axis XX' each with a distinct radial orientation as illustrated in FIG. 3A. The arms are spaced circumferentially from each other (for example regularly as here). Each of the arms B1-B8 extends radially along the entire height of the swan neck (radial dimension), that is to say from the inner hub 48 to the annular belt 46, and axially or longitudinally along all or part of the length of the swan neck. Two consecutive (that is to say circumferentially adjacent) arms define therebetween, locally, a volume slice or segment of the annular duct portion 28 defining the swan neck. This applies here to all the arms of the plurality of circumferentially distributed arms. Such a volume slice or segment extends following an angular sector (defined by the angular deviation between the arms following a cross-sectional view) and axially or longitudinally and thus defines, between these arms, a local volume in which flows a fraction of the air path which circulates in the annular duct portion 28 defining the swan neck.

The arms which extend inside the swan neck are here arms called structural arms, that is to say these arms have a mechanical function of connecting and transmitting the forces between the annular belt 46 and the inner hub 48. In the present embodiment, these arms each have a rectilinear/straight profile from upstream to downstream (following their axial extension) and without inclination (no aerodynamic profile), and they therefore have no function of straightening/guiding the air stream. However, in other embodiments not illustrated, these structural arms can also be aerodynamically profiled so as to exert an aerodynamic function on the flow circulating in the annular duct portion 28 defining the swan neck. Alternatively, the arms that extend into the swan neck may have only an aerodynamic function. According to other possible configurations, only part of the arms can have a structural function with possibly an aerodynamic fairing.

In the present embodiment, an intermediate wall P1 to P8 extends circumferentially, respectively between the two circumferentially adjacent (consecutive) arms of each pair of arms, namely the pairs of arms B1-B2, B2-B3, B3-B4, B4-B5, B5-B6, B6-B7, B7-B8 and B8-B1. It will be noted that in other turbojet engine configurations not represented here, only some pairs of arms of the plurality of arms can include, between the consecutive arms of the pairs of arms concerned, one or several intermediate walls within the meaning of the present invention.

In the configuration represented in FIGS. 3A and 3B, a single intermediate wall is positioned between the two circumferentially adjacent arms of each pair of arms (and mechanically connected in a known manner to each of the arms) so as to subdivide the slice or segment of the annular duct portion externally delimited by these arms into a radially inner portion Ci (inner channel), for an inner portion of the fraction of the air path or air stream flowing between the two adjacent arms, and a radially outer portion Ce (outer channel), for an outer portion of the fraction of the air path or air stream flowing between the two adjacent arms, as illustrated in FIGS. 2 and 3B (volume space between the arms B1 and B2). As represented in FIG. 3B, the intermediate wall, such as P2 in FIG. 3B, has a profile that follows the profile of the swan neck, that is to say it matches the shape of the inner wall (wall of the inner hub 48) and outer wall (inner wall of the annular belt 46) which define therebetween the swan neck, so as not to introduce too many disturbances in the guiding of the air path.

In the present embodiment which is represented very schematically in the enlarged longitudinal section of FIG. 3C, the intermediate wall P1 is represented axially centered with respect to the axial extension of the arm B1 represented in the background. This wall can extend over the entire axial extension of the arm B1 (and of the arm B2) or extend only over a fraction of the axial extension of the arm B1 (and of the arm B2), by being at equal distance from the leading edge ba and from the trailing edge bf of the arm. The configuration where the intermediate wall only extends over a fraction of the axial extension of the arm B1 (and of the arm B2) makes it possible to limit the aerodynamic losses. In the present embodiment, the wall P1 thus has an axial extension or length which can vary between 50 and 100% of the axial extension or length of the arm.

When the wall only extends over a fraction of the axial extension of the arm, such an arrangement makes it possible to avoid limiting the ability of the flow to be radially redistributed upstream of the downstream compressor 26 of FIG. 1, in particular towards an area radially external to the inner channel Ci, in case where the latter is obstructed or limited due to possible abnormal behavior of this downstream compressor (for example an absence of flow rate draw at the base of the compressor).

In one variant of embodiment schematically illustrated in the longitudinal section of FIG. 4, the intermediate wall P1' which extends between the two consecutive (circumferentially adjacent) arms of the same pair of arms is shorter than in FIG. 3C and is axially offset upstream (while getting closer to the leading edge ba of the arm B1 and away from the trailing edge bf of this arm) with respect to the axially centered position of FIG. 3C. This arrangement offers the flow a greater ability, than in the embodiment of FIG. 3C, to be radially redistributed upstream of the downstream compressor 26 of FIG. 1 because the flow is less constrained radially in this region. According to this variant, the wall P1' thus has an axial extension or length less than 100% of the axial extension or length of the arm and which can go down to 50% of it.

In the configurations of FIGS. 3C and 4, the angle or inclination of the intermediate wall P1/P1' with respect to the longitudinal direction XX' can be identical to that of the swan neck (slope of the swan neck) or deviate from it at an angular deviation by +/−20°.

Moreover, in these configurations, the installation height of the intermediate wall, namely its radial position with respect to the inner wall pi of the swan neck (here the lower wall in the figures), is located between 35 and 65% of the height H so that the heights of the two channels are not too disproportionate to each other.

FIG. 5 which is a view similar to that of FIGS. 3C and 4 illustrates another embodiment in which several intermediate walls extend between the two circumferentially adjacent arms of the same pair of arms by being axially distributed following the axial extension or length of the two arms. More particularly, an upstream intermediate wall P1" is disposed between the two arms at the level of the leading edge ba of each of the arms (by slightly protruding beyond this edge) and a downstream intermediate wall P2" is disposed between the two arms at the level of the trailing edge bf of each of the arms.

In the present embodiment, each intermediate wall has an axial extension or length which can vary between 10% and 50% of the axial extension or length of the arm. The two walls can for example have radial positions offset from each other.

It will be noted that the installation height or radial position of each intermediate wall with respect to the inner wall pi of the swan neck (here the lower wall in the figures) can be different according to their axial position (in the longitudinal direction of the axis XX'), in particular in order to optimize the guiding of the flow and the aerodynamic losses. The installation height of the intermediate wall P1" can thus be greater than that of the intermediate wall P2" or smaller than the latter depending on the geometry. The installation height of the intermediate walls can vary between 25 and 75% of the height H.

In this embodiment, the angle or inclination of each intermediate wall can be identical to that of the swan neck (slope of the swan neck) or deviate from it at an angular deviation by +/−20°.

FIG. 6 which is a view similar to that of FIG. 5 illustrates one variant of embodiment in which a series of intermediate walls extend, on the one hand, circumferentially between the two circumferentially adjacent arms of the same pair of arms and, on the other hand, axially successively between the leading edge ba of each of the two arms and the trailing edge bf of each of them.

More particularly, the series of intermediate walls which here include five elements or fins (this number may however differ depending on the configurations and for example be three, four, . . . , ten), is configured axially so that the first intermediate wall P1''' is disposed at the level of the leading edge ba of each of the two arms and so that the last intermediate wall P5''' is disposed at a distance from and upstream of the trailing edge bf of each of the arms or at this trailing edge bf.

In this variant, each intermediate wall has an axial extension or length which can vary between 10 and 15% of the axial extension or length of the arm.

It will be noted that the installation height or radial position of each intermediate wall can be different according to their axial position, in particular in order to optimize the guiding of the flow and the aerodynamic losses. Thus, the installation height of the first intermediate wall P1''' can be greater than that of the second immediately downstream intermediate wall and so on until the last intermediate wall P5'''. The reverse arrangement can also be envisaged. The installation height of the intermediate walls can vary between 25 and 75% of the height H.

In this variant, the angle or the inclination of each intermediate wall can be identical to that of the swan neck (slope of the swan neck) or deviate from it at an angular deviation by +/−20°.

FIGS. 7A and 7B illustrate a possible configuration in which the aircraft turbojet engine comprises means for modifying an inclination of an intermediate wall P1'''' (identical to the wall P1' of FIG. 4) relative to the annular duct portion 28. More particularly, the inclination of this intermediate wall with respect to the inner wall pi (and therefore with respect to the axis XX') can vary depending on the inclination control communicated to it by conventional means such as a hydraulic or electric cylinder in order to adopt an angle of inclination a (downward slope) with respect to a neutral angle of inclination i corresponding to the inclination or slope of the swan neck (FIG. 7A) or an angle of inclination β (upward slope) with respect to a neutral angle of inclination i corresponding to the inclination or slope of the swan neck (FIG. 7B). The value of each angle can vary within a range of 20°.

This inclination variability and this position drive can be used as a function of the engine speed, for example in order to limit the aerodynamic losses and optimize the efficiency of the intermediate wall. Thus, the configuration in FIG. 7A redirects the stream towards the hub (inner wall of the casing), thus limiting the losses on the latter. The configuration in FIG. 7B redirects the stream towards the outer casing wall, thus limiting the losses on the latter.

FIGS. 8A and 8B illustrate another possible configuration of an inner swan neck arrangement within the meaning of the present invention in which the intermediate wall which extends between two circumferentially adjacent arms (and this, for all of the plurality of the radial arms arranged in the swan neck, in other configurations not represented, the intermediate wall may be present only between some circumferentially adjacent arms) has, following a radial view illustrated in FIG. 8A for the arms B1', B2' and B3' (that is to say a view taken along a radius of the swan neck, from the outside of the latter), a general Y shape. The common branch Y1a, Y2a of each wall Y1, Y2 in FIG. 8A is disposed against a first of the two circumferentially adjacent arms (here respectively B1' and B2') and the two branches Y1b and Y1c, Y2b and Y2c of each wall Y1, Y2 are disposed against the second of the two arms (here respectively B2' and B3').

Moreover, as illustrated in the cross-sectional view (relative to the longitudinal axis XX') of FIG. 8B, each intermediate wall, such as the walls Y1 and Y2 defined above, which extends between the two circumferentially adjacent (for example structural) arms also has a general Y shape (following the radial extension): the common branch of the Y, here Y1a and Y2a, is disposed against the first arm (here B1' and B2') and the two end branches Y1b and Y1c, Y2b and Y2c of each wall Y1, Y2 are in fact split to each adopt a Y shape. Only the branch Y1c and Y2c of each wall is represented in FIG. 8B split into two sub-branches Y1c1 and Y1c2, Y2c1 and Y2c2 respectively.

Each intermediate wall thus has a double Y shape with a different axial position depending on whether the wall is on the left or on the right of the arm (FIG. 8A) and a different radial position depending on whether the wall is on the left or on the right of the arm (FIG. 8B). The double Y configuration of the intermediate walls has an aerodynamic function of straightening the flow. This arrangement can prove useful if the air entering the swan neck has not been sufficiently straightened upstream. The asymmetry of the different branches makes it possible to adapt to the asymmetry of the flow.

In a configuration not represented in the figures, the reverse arrangement can be envisaged, namely the branches of the Y are oriented towards the left.

In the embodiments described and in their variants, the turbojet engine is of the two-spool type. The turbojet engine can however be of the triple-spool type. The turbojet engine can be of the fan type (turbofan) or be a propeller reactor. In this last configuration, the height difference between the inlet of the primary air path and the casing or spool of the high-pressure compressor is particularly significant, which results in a particularly constrained swan neck in the transition area between the low-pressure compressor and the high-pressure compressor, and therefore of high criticality. The invention is therefore particularly useful in this type of configuration. Moreover, some configurations of turbojet engines, in particular propeller turbojet engines, include, in the annular duct where the air path circulates, at least two duct portions each defining a downwardly sloping swan neck and which are spaced from each other along the longitudinal axis XX' (at least two successive upstream and downstream swan necks). The invention is in particular applicable to this type of configuration, as to any turbojet engine configuration including a downwardly sloping swan neck.

FIG. 9 illustrates one possible exemplary architecture of a turbofan engine 60 with an unducted fan 62, here comprising contra-rotating propellers, and in which a swan neck 64 disposed upstream is capable of integrating one of the embodiments or variants described above.

Although the present description refers to specific exemplary embodiments, modifications can be made to these examples without departing from the general scope of the invention as defined by the claims. Furthermore, individual characteristics of the different embodiments illustrated or mentioned may be combined in additional embodiments. Consequently, the description and drawings should be considered in an illustrative rather than a restrictive sense.

The invention claimed is:

1. An aircraft turbomachine subassembly comprising an annular duct which extends concentrically about a longitudinal axis and wherein an air stream flows from upstream to downstream, the annular duct comprising at least one duct portion which defines, for the air stream, a swan neck having an upstream inlet section and a downstream outlet section, the turbomachine subassembly comprising, in said at least one duct portion, a plurality of arms which extend according to a circumferential distribution relative to the longitudinal axis in a spaced manner from each other, each following a radial and axial extension, wherein the aircraft turbomachine subassembly comprises one or several intermediate walls extending between two circumferentially adjacent arms which form a pair of circumferentially adjacent arms among the plurality of circumferentially adjacent arms so as to locally separate, between the two arms of the pair of arms, said at least one annular duct portion into a radially inner portion for an inner portion of the air stream and a radially outer portion further away from the longitudinal axis than the radially inner portion for an outer portion of the air stream, wherein the aircraft turbomachine subassembly comprises means for modifying an inclination of the one or several intermediate walls relative to said at least one annular duct portion.

2. The aircraft turbomachine subassembly according to claim 1, wherein the downstream outlet section of the swan neck is closer to the longitudinal axis than the upstream inlet section.

3. The aircraft turbomachine subassembly according to claim 1, wherein the intermediate wall which extends between the two circumferentially adjacent arms is axially centered relative to the axial extension of the two arms.

4. The aircraft turbomachine subassembly according to claim 1, wherein the intermediate wall which extends between the two circumferentially adjacent arms is axially offset upstream with respect to a centered position relative to the axial extension of the two arms.

5. The aircraft turbomachine subassembly according to claim 3, wherein the intermediate wall which extends between the two circumferentially adjacent arms has, following a radial view, a general Y shape whose common branch of the Y is disposed against a first of the two circumferentially adjacent arms and the two branches of the Y are disposed against a second of arms.

6. The aircraft turbomachine subassembly according to claim 3, wherein the intermediate wall which extends between the two circumferentially adjacent arms has, following a cross-sectional view relative to the longitudinal axis XX', a general Y shape whose common branch of the Y is disposed against a first arm and two end branches of the Y disposed against a second arm are each split into so as to each form two end sub-branches giving the Y shape following this cross section.

7. The aircraft turbomachine subassembly according to claim 1, wherein, when the aircraft turbomachine subassembly comprises several intermediate walls between the two circumferentially adjacent arms, the intermediate walls are axially distributed following the axial extension of the two arms.

8. The aircraft turbomachine subassembly according to claim 7, wherein the aircraft turbomachine subassembly comprises an upstream intermediate wall disposed between the two arms at level of an edge called leading edge of each of the two arms and a downstream intermediate wall disposed between the two arms at the level of an opposite edge called trailing edge of each of the two arms.

9. The aircraft turbomachine subassembly according to claim 7, wherein the aircraft turbomachine subassembly comprises a series of intermediate walls which axially extend successively between an edge called leading edge of each of the two arms and an edge called trailing edge of each of the two arms.

10. The aircraft turbomachine subassembly according to claim 9, wherein the series of intermediate walls is configured axially such that a first intermediate wall of the series of intermediate walls is disposed at a level of the leading edge of each of the two arms and such that a last intermediate wall of the series of intermediate walls is disposed upstream of the trailing edge of each of the two arms or at this trailing edge.

11. The aircraft turbomachine subassembly according to claim 7, wherein each of the intermediate walls has a radial position which is different according to an axial position it occupies relative to the axial extension of the two circumferentially adjacent arms along the longitudinal axis.

12. The aircraft turbomachine subassembly according to claim 1, wherein the aircraft turbomachine subassembly comprises, for each of one or several other pairs of circumferentially adjacent arms of the plurality of circumferentially adjacent arms, one or several intermediate walls extending between the two circumferentially adjacent arms of the pair or other pairs of circumferentially adjacent arms so as to locally separate, between the two arms of the pair of arms or each of the other pairs of arms, said at least one annular duct portion into a radially inner portion for an inner portion of the air stream and a radially outer portion further away from the longitudinal axis than the radially inner portion for an outer portion of the air stream.

13. The aircraft turbomachine subassembly according to claim 1, wherein the circumferentially adjacent arms have no function of straightening the air stream flowing in the annular duct.

14. The aircraft turbomachine subassembly according to claim 1, wherein the aircraft turbomachine subassembly comprises at least two duct portions each defining a swan neck and which are spaced from each other along the longitudinal axis.

15. The aircraft turbomachine comprising an aircraft turbomachine subassembly according to claim 1.

* * * * *